United States Patent
Matsutani

(10) Patent No.: US 6,995,766 B2
(45) Date of Patent: Feb. 7, 2006

(54) HIERARCHICAL LATTICE GENERATING METHOD, APPARATUS, AND STORAGE DEVICE STORING A PROGRAM THEREOF

(75) Inventor: Shigeki Matsutani, Kanagawa (JP)

(73) Assignee: Canon Kabushiki Kaisha, (JP)

( * ) Notice: Subject to any disclaimer, the term of this patent is extended or adjusted under 35 U.S.C. 154(b) by 458 days.

(21) Appl. No.: 10/191,390

(22) Filed: Jul. 8, 2002

(65) Prior Publication Data
US 2003/0034972 A1   Feb. 20, 2003

(30) Foreign Application Priority Data
Jul. 6, 2001  (JP)  .............................. 2001-206502

(51) Int. Cl.
*G06T 17/00*  (2006.01)
(52) U.S. Cl. ...................................... 345/428
(58) Field of Classification Search ................. 345/420
See application file for complete search history.

(56) References Cited

U.S. PATENT DOCUMENTS

| | | | | |
|---|---|---|---|---|
| 4,868,748 A | * | 9/1989 | Crawford et al. | 382/131 |
| 5,313,567 A | * | 5/1994 | Civanlar et al. | 345/424 |
| 5,517,602 A | * | 5/1996 | Natarajan | 345/419 |
| 6,662,287 B1 | * | 12/2003 | Andreev et al. | 711/170 |
| 2002/0130858 A1 | * | 9/2002 | Perry et al. | 345/420 |
| 2002/0135577 A1 | * | 9/2002 | Kase et al. | 345/424 |
| 2002/0167518 A1 | * | 11/2002 | Migdal et al. | 345/428 |
| 2003/0052875 A1 | * | 3/2003 | Salomie | 345/419 |

* cited by examiner

*Primary Examiner*—Ulka J. Chauhan
*Assistant Examiner*—Peter-Anthony Pappas
(74) *Attorney, Agent, or Firm*—Rossi, Kimms & McDowell, LLP

(57) ABSTRACT

Hierarchical lattice generating method, apparatus, and program are capable of representing figures of areas in the neighborhood of boundary surfaces on a hierarchical lattice at reduced computation costs and with desired resolutions, using form data for computer simulation. A hierarchical lattice is generated by dividing a group of cells that are composed of vertices and line segments present in a predetermined area, in accordance with a resolution. A boundary surface provided in the area, is represented in the hierarchical lattice by hierarchically dividing cells in a vicinity of a boundary surface. A first value is assigned as an initial value to all of the vertices in the area in an initial state. A second value is assigned to each of vertices in focus, out of the vertices, that has the first value or the second value if any cell to which each of the vertices in focus belongs includes the boundary surface, and otherwise assigning a third value to each of the vertices in focus. Each of cells in the area, to which vertices that have the second value belong, is divided, the third value is assigned to a vertex that is newly generated by the dividing if vertices at both ends of a line segment that has the newly generated vertex as a midpoint have the third value, and otherwise the first value is assigned to the newly generated vertex.

15 Claims, 10 Drawing Sheets

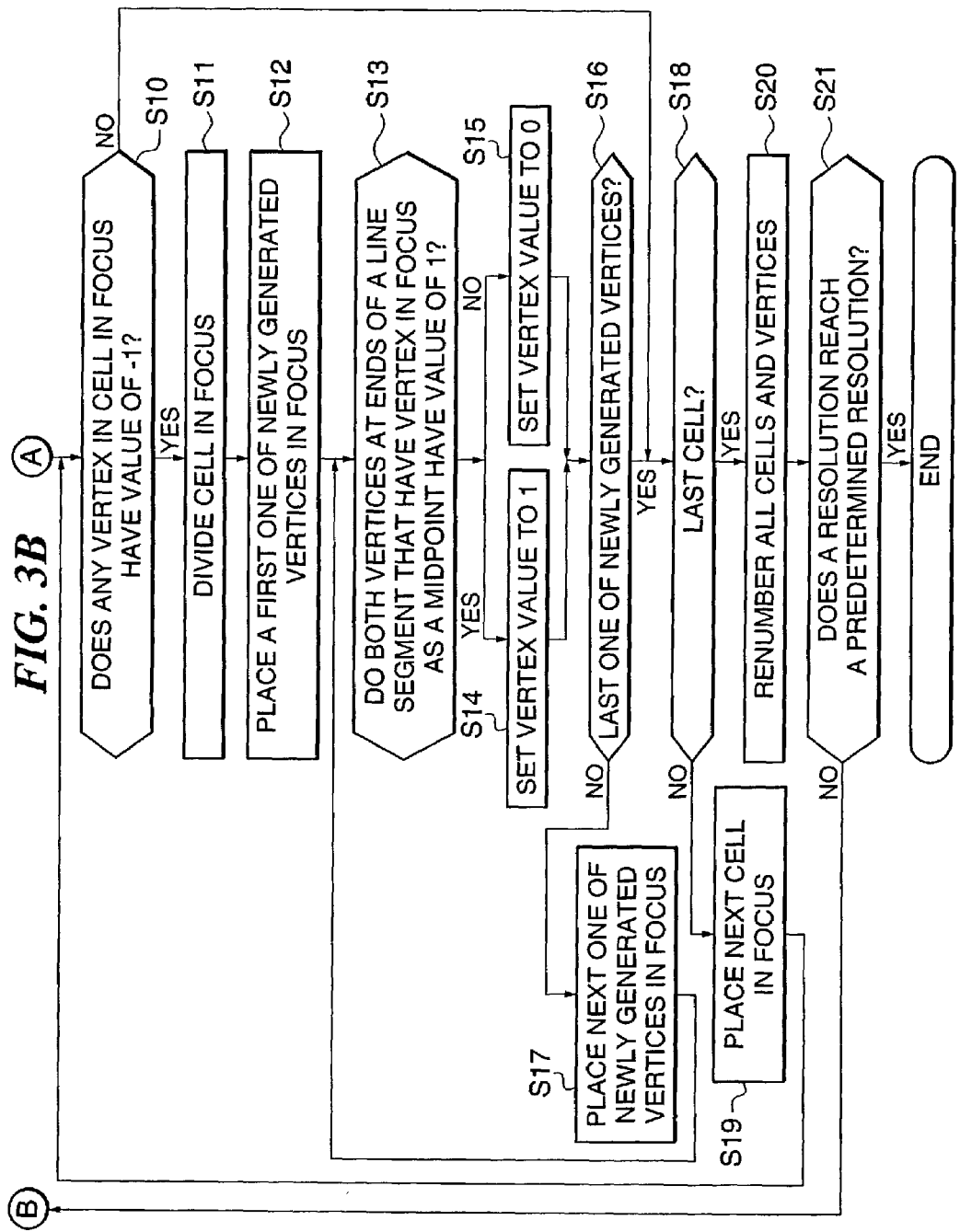

HIERARCHICAL LATTICE GENERATING METHOD, APPARATUS, AND STORAGE DEVICE STORING A PROGRAM THEREOF

BACKGROUND OF THE INVENTION

1. Field of the Invention

The present invention relates to a hierarchical lattice generating method, apparatus, and program for generating a hierarchical lattice at a boundary part of an object in accordance with a desired resolution when a computer simulation is executed.

2. Description of the Related Art

Many computer simulators that use hierarchical lattices have been developed. Examples of detailed descriptions of such computer simulators are John Strain, "Fast Tree-Based Redistancing for Level Set Computations", in the Journal of Computational Physics 152, p. 664–686 (1999) and Michael Griebel, Gerhard Zumbusch, "Parallel Adaptive Subspace Correction Schemes with Applications to Elasticity" in "Computer Methods in Applied Mechanics and Engineering" 184 p. 303–332(2000) and the references given by these articles.

These articles describe an arrangement wherein the resolution (hierarchy) of areas in the neighborhood of the boundary surfaces of objects that need to be represented in high resolution can be raised as desired. According to this arrangement, the areas in the neighborhood of the boundary surfaces are mathematically represented by a "filter space" so that the resolution can be appropriately defined. A similar arrangement has been proposed in the field of computer graphics as a method for representing objects (see Japanese Laid-Open Patent Publications (Kokai) Nos. 6-215076, 9-198524, and 2001-52206.

When executing many computer simulations, it is necessary to input the form of the object, and in particular the form of the boundary parts of the object. In many cases, the boundary surfaces which form such boundary parts have a codimension 1. When a simulation is performed within a two-dimensional plane, boundary surfaces are constructed of curves or broken lines as piecewise linear figures. When a simulation is performed within a three-dimensional space, boundary surfaces are constructed of two-dimensional curved surfaces and curved surfaces composed of piecewise flat surfaces.

These boundary parts that include boundary surfaces often have an important role in computer simulations as the regions that apply boundary conditions for partial differential equations. Therefore, such boundary parts should be represented using deep (i.e., fine) hierarchical lattices. As one example, the aforementioned reference John Strain, "Fast Tree-Based Redistancing for Level Set Computations", Journal of Computational Physics 152, p. 664–686 (1999) proposes a calculation method for raising the resolution of boundary parts to a desired precision by using a method called the "level set method". The level set method proposed by Strain will be described briefly below.

As one example, the level set method is described in detail in J. A. Sethian "Level Set Methods and Fast Marching Methods: Evolving Interfaces in Computational Geometry Fluid Mechanics, Computer Vision, and Materials Science" Cambridge University Press that was published in 1996.

The "level set method" sets coordinates that are determined according to the natural distances within a region that is perpendicular to a boundary surface with a codimension 1, and regards the values of these coordinates as a scalar function within the region. In mathematical terms, the method is based upon the fact that if the boundary surface is sufficiently smooth, at the tubular neighborhoods of the boundary surface the normal bundle and tubular neighborhoods are diffeomorphisms.

In conventional practice, the zero point of the perpendicular coordinates is set on the boundary surface in the level set method. Normally, the perpendicular coordinates of points located far away from the boundary surface become mathematically meaningless. The level set function, however, does not consider such mathematical details and uses values that are determined by numerical computations as coordinate values. In this way, the level set method is not generally well-defined, but is a sufficiently effective method for boundary surfaces that are sufficiently smooth within a Euclidean space. Strain's method changes the resolution in accordance with the magnitude (that is, the distance from the boundary surface in the direction of a codimensional normal) of the level set function.

Japanese Laid-Open Patent Publications (Kokai) Nos. 6-215076, 9-198524, and 2001-52206 propose similar methods for controlling the resolution using a distance function as methods for changing the resolution in the field of computer graphics. The basic concept of these methods is almost the same as Strain.

However, in Japanese Laid-Open Patent Publication (Kokai) No. 9-198524, areas at and close to the boundary surfaces of the object that are related to the raising and lowering of the resolution are not in the form of a mathematical filter space, which differs from resolution spaces (hierarchical spaces) in the field of computer simulation, as exemplified by the teachings of Strain.

A level set function is normally found by calculating the distance from the boundary surface in the direction of a codimensional normal. Strain, meanwhile, finds a level set function by calculating the distance from a piecewise segmental curve.

However, the computational cost of calculating such distances with a computer are normally high, and various problems are known to occur for such floating point calculations. Accordingly, algorithms that include distance calculations suffer from the same problems.

SUMMARY OF THE INVENTION

It is an object of the present invention to provide a hierarchical lattice generating method, a hierarchical lattice generating apparatus, and a hierarchical lattice generating program which are capable of representing figures of areas in the neighborhood of boundary surfaces on a hierarchical lattice at reduced computation costs and with desired resolutions, using form data for computer simulation.

Some of the problems solved by the present invention are also present in the field of computer graphics, with the present invention also providing a solution for such similar problems.

To achieve the stated object, according to a first aspect, the present invention provides a hierarchical lattice generating method comprising a generating step of generating a hierarchical lattice by dividing a group of cells that are composed of vertices and line segments present in a predetermined area, in accordance with a resolution, a representing step of representing a boundary surface, which is provided in the area, in the hierarchical lattice by hierarchically dividing cells in a vicinity of a boundary surface in the boundary surface, a first step of assigning a first value as an initial value to all of the vertices in the area in an initial state, a second step of assigning; a second value to each of vertices in focus, out of the vertices in the area, that has the first value or, the second value if any cell to which each of the vertices in focus belongs includes the boundary surface, and otherwise assigning a third value to each of the vertices in focus, and a third step of dividing each of cells, out of all of the cells in the area, to which vertices that have the second value belong, assigning the third value to a vertex that is newly generated by the dividing if vertices at both ends of a line segment that has the newly generated vertex as a midpoint have the third value, and otherwise assigning the first value to the newly generated vertex.

In the first aspect, it is preferable that the hierarchical lattice generating method further comprises a fourth step of targeting each vertex, after the third step, deleting the targeted vertex if all of the vertices belonging to all of the cells containing the targeted vertex have the third value, and combining a plurality of cells containing the deleted vertex into at least one cell.

In the first aspect, it is preferable that the second step and the third step are repeatedly performed in order until a highest resolution in the area reaches a predetermined resolution.

In the first aspect, if the fourth step is included, it is preferable that the second step, the third step, and the fourth step are repeatedly performed in order until a highest resolution in the area reaches a predetermined resolution.

In the first aspect, it is preferable that the group of cells are in a form of polygons.

In the first aspect, alternatively it is preferable that the group of cells are in a form of blocks.

In the first aspect, it is preferable that a function which has positive values inside of the boundary surface and negative values outside of the boundary surface is provided, and in the second step, it is judged whether or not a cell includes the boundary surface based on values of the function in the cell.

To achieve the stated object, according to a second aspect, the present invention provides a hierarchical lattice generating apparatus, comprising generating means for generating a hierarchical lattice by dividing a group of cells that are composed of vertices and line segments present in a predetermined area, in accordance with a resolution, representing means for representing a boundary surface, which is provided in the area, in the hierarchical lattice by hierarchically dividing cells in a vicinity of a boundary surface in the boundary surface, first assigning means for assigning a first value as an initial value to all of the vertices in the area in an initial state, second assigning means for assigning; a second value to each of vertices in focus, out of the vertices in the area, that has the first value or the second value if any cell to which each of the vertices in focus belongs includes the boundary surfaces and otherwise assigning a third value to each of the vertices in focus, and third assigning means for dividing each of cells, out of all of the cells in the area, to which vertices that have the second value belong, assigning the third value to a vertex that is newly generated by the dividing if vertices at both ends of a line segment that has the newly generated vertex as a midpoint have the third value, and otherwise assigning the first value to the newly generated vertex.

In the second aspect, it is preferable that the hierarchical lattice generating apparatus further comprises combining means for targeting each vertex, after processing by the third assigning means, deleting the targeted vertex if all of the vertices belonging to all of the cells containing the targeted vertex have the third value, and combining a plurality of cells containing the deleted vertex into at least one cell.

In the second aspect, it is preferable that processing by the second assigning means and the third assigning means is repeatedly performed in order until a highest resolution in the area reaches a predetermined resolution.

In the second aspect, if the combining means is included, it is preferable that processing by the second assigning means, the third assigning means, and the fourth assigning means is repeatedly performed in order until a highest resolution in the area reaches a predetermined resolution.

In the second aspect, it is preferable that the group of cells are in a form of polygons.

In the second aspect, alternatively it is preferable that the group of cells are in a form of blocks.

In the second aspect, it is preferable that a function which has positive values inside of the boundary surface and negative values outside of the boundary surface is provided, and the second assigning means judges whether or not a cell includes the boundary surface based on values of the function in the cell.

To achieve the stated object, according to a third aspect, the present invention provides a program including program code for realizing the hierarchical lattice generating method according to the present invention.

According to the present invention, it is possible to precisely represent figures of areas at and close to boundary surfaces on a hierarchical lattice with a desired resolution that is stepwise changeable, using form data for computer simulation. The hierarchical lattice is a digital construction that is composed of binary information showing whether smaller cells are present within each cell, so that the form of an object can be represented by a calculation method that uses only integer information. Since the generation process for a hierarchical lattice is in the form of a robust generating method composed of only digital calculations, a reduction can be made in the computation cost and various problems associated with floating point computations can be avoided. Also, the same effects can be achieved when representing an object on a computer using computer graphics or the like.

The above and other objects, features, and advantages of the invention will become more apparent from the following detailed description taken in conjunction with the accompanying drawings.

BRIEF DESCRIPTION OF THE DRAWINGS

FIGS. 3A and 3B is a flowchart showing processing procedure for executing a boundary surface representing algorithm according to the first embodiment;

DETAILED DESCRIPTION OF THE PREFERRED EMBODIMENTS

The present invention will now be described in detail with reference to the accompanying drawings showing preferred embodiments thereof.

Figure 1:
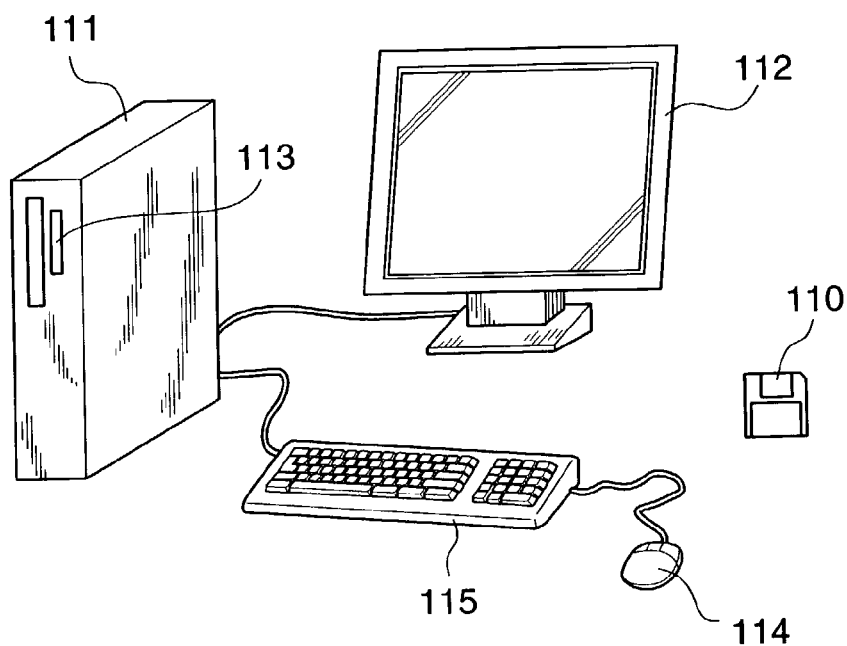
FIG. 1 is a view showing the construction of a computer system that uses the hierarchical lattice generating method according to a first embodiment of the present invention.
Figure 2:
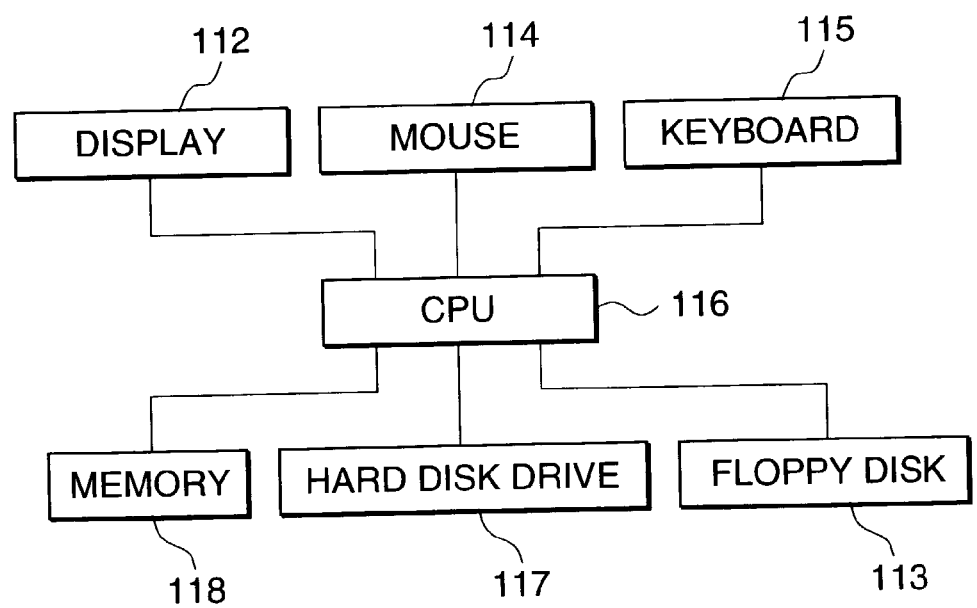
FIG. 2 is a block diagram showing the construction of a computer main unit 111 appearing in FIG. 1.

FIG. 1 shows the construction of a computer system that uses the hierarchical lattice generating method according to a first embodiment of the present invention. The computer system is comprised of a computer main unit 111, a display 112, a keyboard 115, and a mouse 114. FIG. 2 is a block diagram showing the construction of the computer main unit 111. The computer main unit 111 is equipped with a CPU 116, a memory 118, a hard disk drive 117, and a floppy disk (flexible disk) drive 113 in which a floppy disk 110 is inserted.

In the present embodiment, an executable file including a boundary surface representing algorithm is stored in advance on the hard disk drive 117 or on the flexible disk 110. When the executable file is loaded into the memory 118 according to a signal from an input device such as the keyboard 115 or the mouse 114, the boundary surface representing algorithm is executed. While the present description only refers to the boundary surface representing algorithm, other algorithms are also executed using the CPU 116 and the memory 118 of the computer main unit 111.

In the present embodiment, a two-dimensional or one-dimensional boundary surface figure is included in advance in a hierarchical lattice formed of cells of polyhedra or polygons that are composed of vertices and line segments.

Figure 3A:
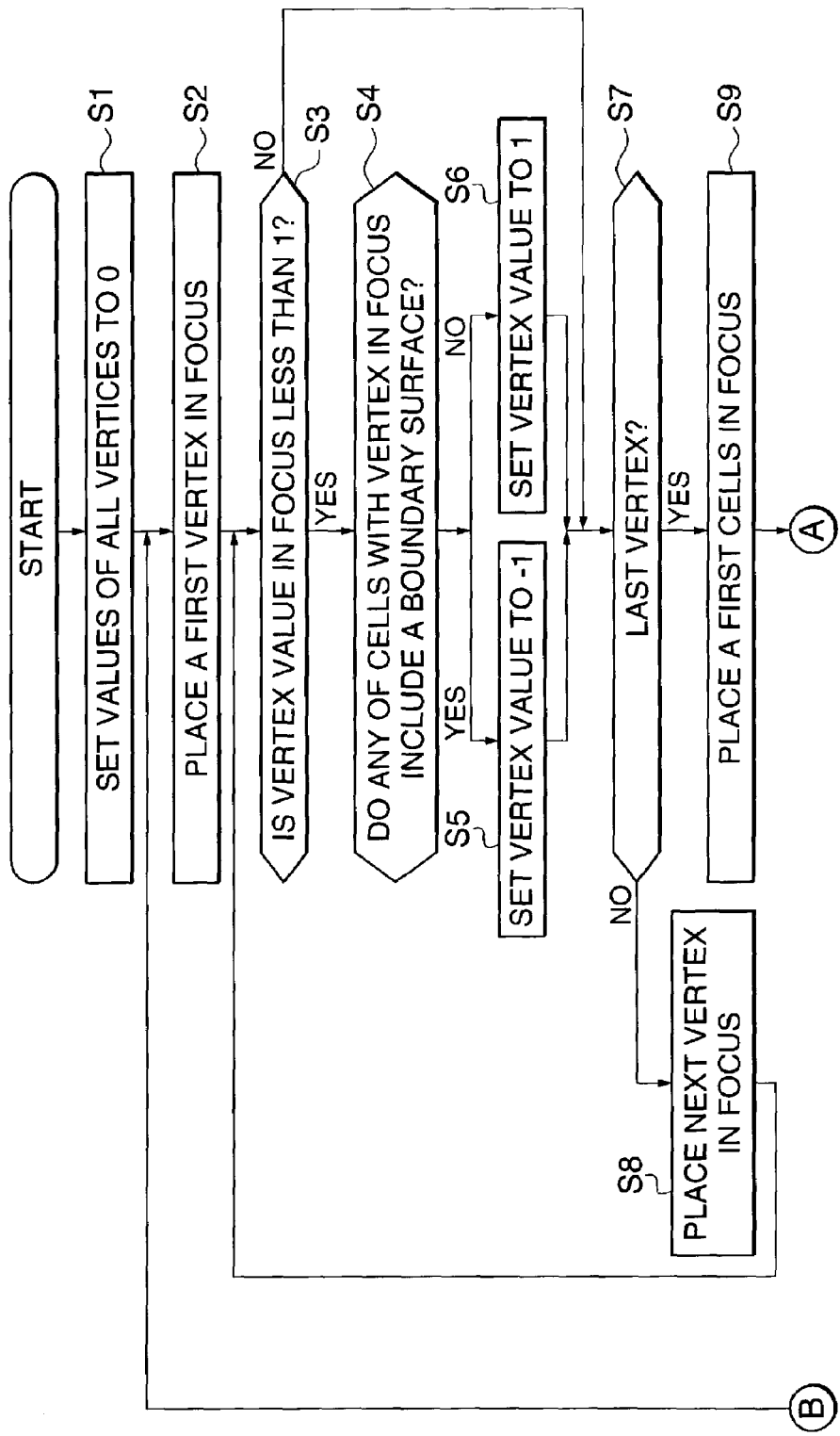

FIGS. 3A and 3B is a flowchart showing processing procedure for executing a boundary surface representing algorithm according to the first embodiment. As mentioned above, an executable file for this processing program is stored on the hard disk drive 117 or on the flexible disk 110 and is executed by the CPU 116.

It is provided that all the cells and vertices are numbered in advance. First, as an initial process, a value of 0 is assigned to every vertex in a basic lattice that has the form of a lattice and is present in a region to be processed in a hierarchical lattice (step S1). After this, by repeatedly performing operations A and B that will be described below until a hierarchical lattice of the desired resolution is produced, the boundary surface figure is represented by a hierarchical lattice.

In operation A in steps S2 to S8, out of all vertices, a first one of the numbered vertices is targeted, i.e. placed into focus (step S2). It is judged whether a value of the vertex in focus is less than 1 (step S3). When the value is less than 1 (YES in step S3), it proceeds to step 4, otherwise it proceeds to step 7. It is determined that any of the cells that include this vertex includes a boundary surface (step S4). When this is the case (YES in step S4), the value of −1 is assigned to the vertex (step S5), and when this is not the case (NO in step S4), the value of 1 is assigned to the vertex (step S6). If the vertex in focus is not the last one of the numbered vertices (NO in step S7), the next one of the numbered vertices is placed into focus (step S8), and the steps S3 to S7 are repeated. If the vertex in focus is the last one (YES in step S7), the process proceeds to operation B.

In operation B in steps S9 to S20, a first one of the numbered cells in the region is placed into focus (step S9), and when any vertex in the cell in focus stores the value of −1 (YES in step S10), the cell in focus is divided (step S11), whereby new vertices are generated. It is provided that the newly generated vertices are also numbered. A first one of the newly generated vertices is placed into focus (step S12). When vertices at both ends of a line segment that has the vertex in focus as a midpoint have the value of 1 (YES in step S13), the vertex in focus is assigned the value of 1 (step S14), and when this is not the case (NO in step S13), the vertex in focus is assigned the value of 0 (step S15). If the vertex in focus is not the last one of the newly generated vertices (NO in step S16), the next one of the newly generated vertices is placed into focus (step S17), and the steps S13 to S16 are repeated. If the vertex in focus is the last one (YES in step S16), it is judged whether the cell in focus is the last one (step S18). If it is not the case, the next one of the numbered cells is placed into focus (step S19), and the steps S10 to S18 are repeated. If the cell in focus is the last one (YES in step S18), all the cells and vertices are renumbered. Then it is determined that a hierarchical lattice of the desired resolution is produced (step S21). If it is not the case, the operations A and B are repeated and if the hierarchical lattice of the desired resolution is obtained, the process is completed.

Figure 5:
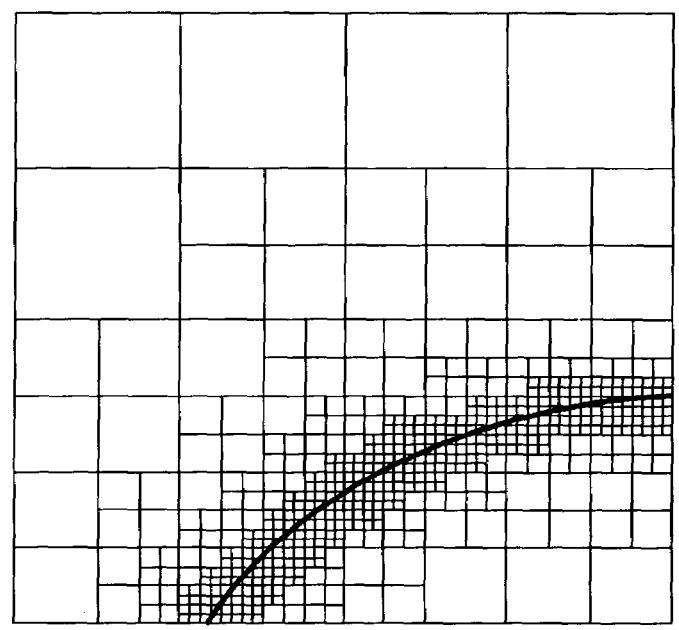
FIG. 5 is a diagram showing a hierarchical lattice that has reached a desired resolution after operation A and operation B have been repeatedly performed in the boundary surface representing algorithm shown in FIGS. 3A and 3B.

In more detail, the following shows a case that is based on a square lattice provided in the form of squares in a two-dimensional plane as the hierarchical lattice. The generation of this hierarchical lattice is executed by the CPU 116 in the computer main unit 111, with the hierarchical lattice being constructed of a group of integers and floating point numbers in the memory 118. As shown in FIG. 5, described later, a hierarchical square lattice whose resolution differs in different areas is finally constructed.

Figure 4A:
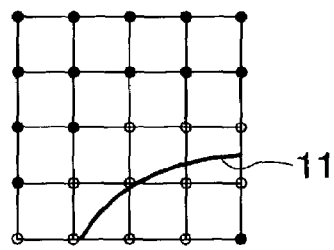
FIG. 4A is a diagram showing a state when operation A has been completed in the boundary surface representing algorithm shown in FIGS. 3A and 3B.

FIGS. 4A to 4D show generation procedure for a hierarchical lattice. First, an ordinary square lattice shown in FIG. 4A is prepared. In FIG. 4A, a boundary surface 11 shown by the thick line is provided in advance. In the present embodiment, the boundary surface 11 is composed of a piecewise segmental figure, and is constructed of a sequence of very fine dots of vertices. For the sake of simplicity, a judgment as to whether a cell includes a line segment is performed by judging whether a vertex lies inside or outside the cell.

As one example, a method of judging whether vertices lie inside or outside cells as disclosed by Japanese Laid-Open Patent Publication (Kokai) No. 11-110569 may be used as the method for the inside/outside judgment of vertices. This inside/outside judgment is performed on convex polygons and can be used with square lattices. More specifically, if points that compose a square with respect to a point P in focus are set as Q1, Q2, Q3, and Q4, a judgment is performed based on the fact that when the cross products of the vector PQ1 with respective ones of the vectors PQ2, PQ3, and PQ4 all have the same sign, the point P is an inside point, and when this is not the case, the point P is an outside point. In this way, the inside/outside judgment can be made by merely performing algebraic calculations. By using such inside/outside judgments and a sequence of dots of vertices that have been very finely subdivided for representing the boundary surface, it becomes easy to judge whether each square cell includes the boundary surface.

That is, in step S1 in FIGS. 3A and 3B, all of the vertices are given the value of 0. In operation A in steps S2 to S8, each of the vertices with a value which is less than 1 are placed into focus, and when any of the cells that include the vertex in focus includes the boundary surface, the vertex is assigned the value of −1. When this is not the case, the vertex is assigned the value of 1. After operation A has been performed for all of the vertices, operation B is performed.

In operation B of steps S9 to S19, each of the cells in the region is placed into focus. When any vertex in the cell in focus has the value of −1, the cell is divided. The vertex that is newly generated by this division is assigned the value of 1 when the values of vertices at both ends of the smallest line segment that has this vertex as a midpoint are 1, otherwise the newly generated vertex is assigned the value of 0.

In step S20, all of the cells and vertices are renumbered. In step S21, it is judged whether the highest resolution in the region is a desired resolution that was provided in advance. When the highest resolution is the desired resolution (YES in step S21), the process is terminated. On the other hand, when the desired resolution has not been reached (NO in step S21), the process returns to step S2, whereby operations A and B are repeated.

FIG. 4A shows the state when operation A has been completed. In the figure, the black circles indicate vertices with the value of 1, while the white circles indicate vertices with the value of −1. A region in the vicinity of the boundary surface 11 is dotted with the white circles. FIG. 4B shows the state when operation B has been completed. All of the cells that included white circles in FIG. 4A have been divided. In FIG. 4B, the double white circles indicate vertices with the value of 0. As can be understood from FIG. 4B, the vertices that are newly generated by operation B are assigned the value of 1 or 0.

Figure 4C:
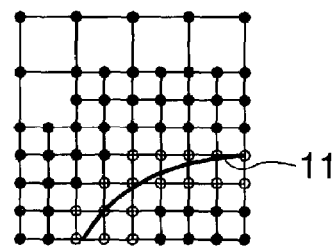
FIG. 4C is a diagram showing a state after operation A has been executed once again in the boundary surface representing algorithm shown in FIGS. 3A and 3B.
Figure 4B:
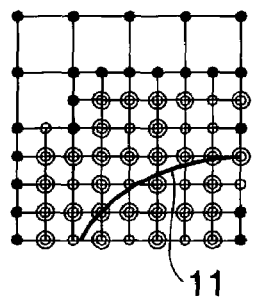
FIG. 4B is a diagram showing a state when operation B has been completed in the boundary surface representing algorithm shown in FIGS. 3A and 3B.
Figure 4D:
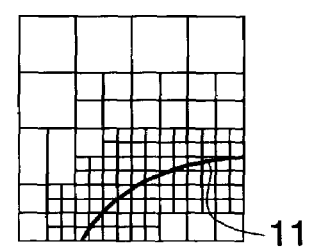
FIG. 4D is a diagram showing a state after operation B has been executed on the state shown in FIG. 4C.

FIG. 4C shows the state after operation A has been performed once again on the new group of cells shown in FIG. 4B. As can be seen from the figure, the white circles are localized in the vicinity of the boundary surface 11. The locality of the white circles in FIG. 4A and the locality of the white circles in FIG. 4C have different resolutions. FIG. 4D shows the state after operation B has been performed on the group of cells shown in FIG. 4C.

In this way, operation A and operation B are repeated until the highest resolution in a predetermined area reaches the desired resolution.

FIG. 5 shows the hierarchical lattice when the desired resolution has been reached through the repeated execution of operation A and operation B. As shown in FIG. 5, the vicinity of the boundary surface is represented precisely and with a desired resolution in a manner that the resolution can be stepwise controlled in a hierarchical lattice.

It should be noted that while the above embodiment shows the case when a lattice with square cells is used, the present invention is not limited to a certain shape of cells, and cells in the form of various polygons, such as triangles or random polygons, may be used.

Figure 6A:
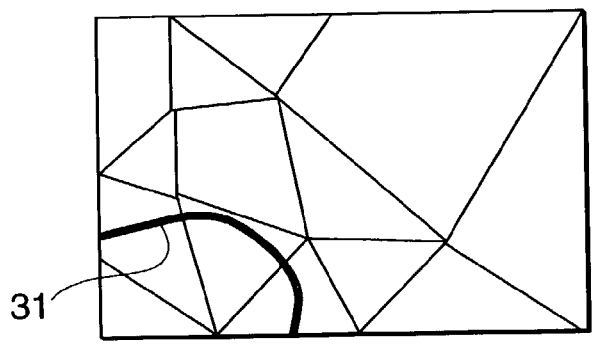
FIG. 6A is a diagram showing a triangular hierarchical lattice in an initial state.
Figure 6B:
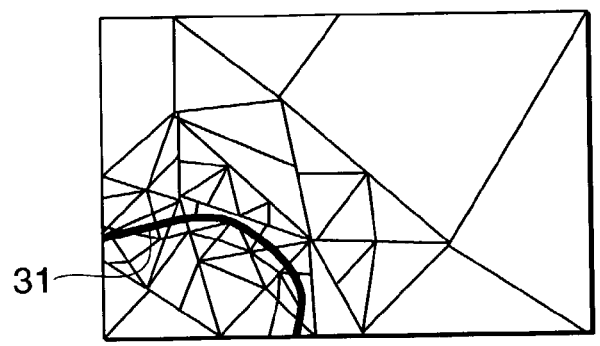
FIG. 6B is a diagram showing the triangular hierarchical lattice after the boundary surface representing algorithm shown in FIGS. 3A and 3B has been executed.

FIGS. 6A and 6B show a triangular hierarchical lattice. FIG. 6A shows the triangular hierarchical lattice in an initial state, and FIG. 6B shows the triangular hierarchical lattice after the boundary surface representing algorithm shown in FIGS. 3A and 3B has been executed. In this way, a boundary surface 31 is precisely represented with a desired resolution by a triangular hierarchical lattice.

Figure 7:
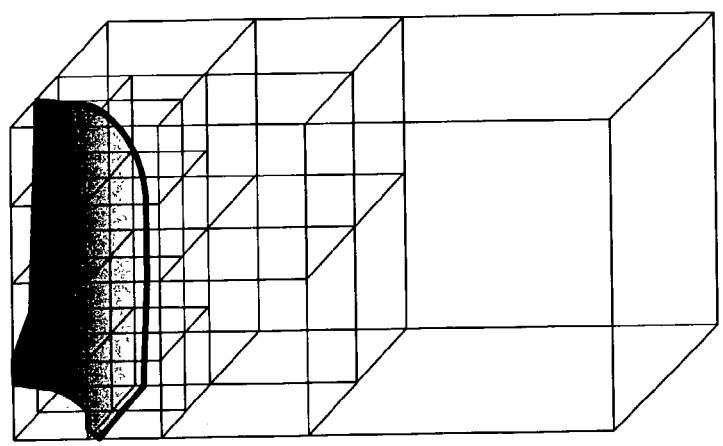
FIG. 7 is a diagram showing a three-dimensional hierarchical lattice after the boundary surface representing algorithm shown in FIGS. 3A and 3B has been executed.

While the above embodiment is applied to the case of a two-dimensional hierarchical lattice, the present invention does not depend upon the number of dimensions, and may be therefore applied to a three-dimensional hierarchical lattice that is composed of cells in the form of blocks. FIG. 7 shows a three-dimensional hierarchical lattice.

In this way, by performing the same processing as performed for the two-dimensional case, a three-dimensional hierarchical lattice can be represented.

Also, the same effects as steps S2 to S8 in FIGS. 3A and 3B above can be achieved by performing operations similar to steps S2 to S8 such that all vertices with a value of less than 1 are placed in focus, the values of such vertices are all initially set to +2, cells including the vertices with the value of +2 are placed into focus, all vertices that belong to any of the cells in focus that include the boundary surface are assigned the value of −1, the values of other vertices are left unchanged, and after this operation has been performed for every cell, finally changing the +2 values to +1. In this way, it is considered that the implementation of the discrete algorithm of the present invention may be achieved in a variety of ways.

The characteristic of the present invention is the inclusion of a step of storing discrete information, which does not include distance information for adjacent cells, at vertices as implemented by part of steps S2 to S8 and a step of judging whether to perform division based on the values of the vertices in cells as implemented by part of steps S9 to S19. Accordingly, it can be understood that the above variation that includes these steps constitutes the present invention. Also, minor differences in the above variation do not affect the present invention.

A second embodiment of the present invention will be described. The construction of a computer system in the second embodiment is the same as in the first embodiment and description thereof is therefore omitted. Only the boundary surface representing algorithm of the present embodiment that differs from the one used by the first embodiment will be described.

Figure 8A:
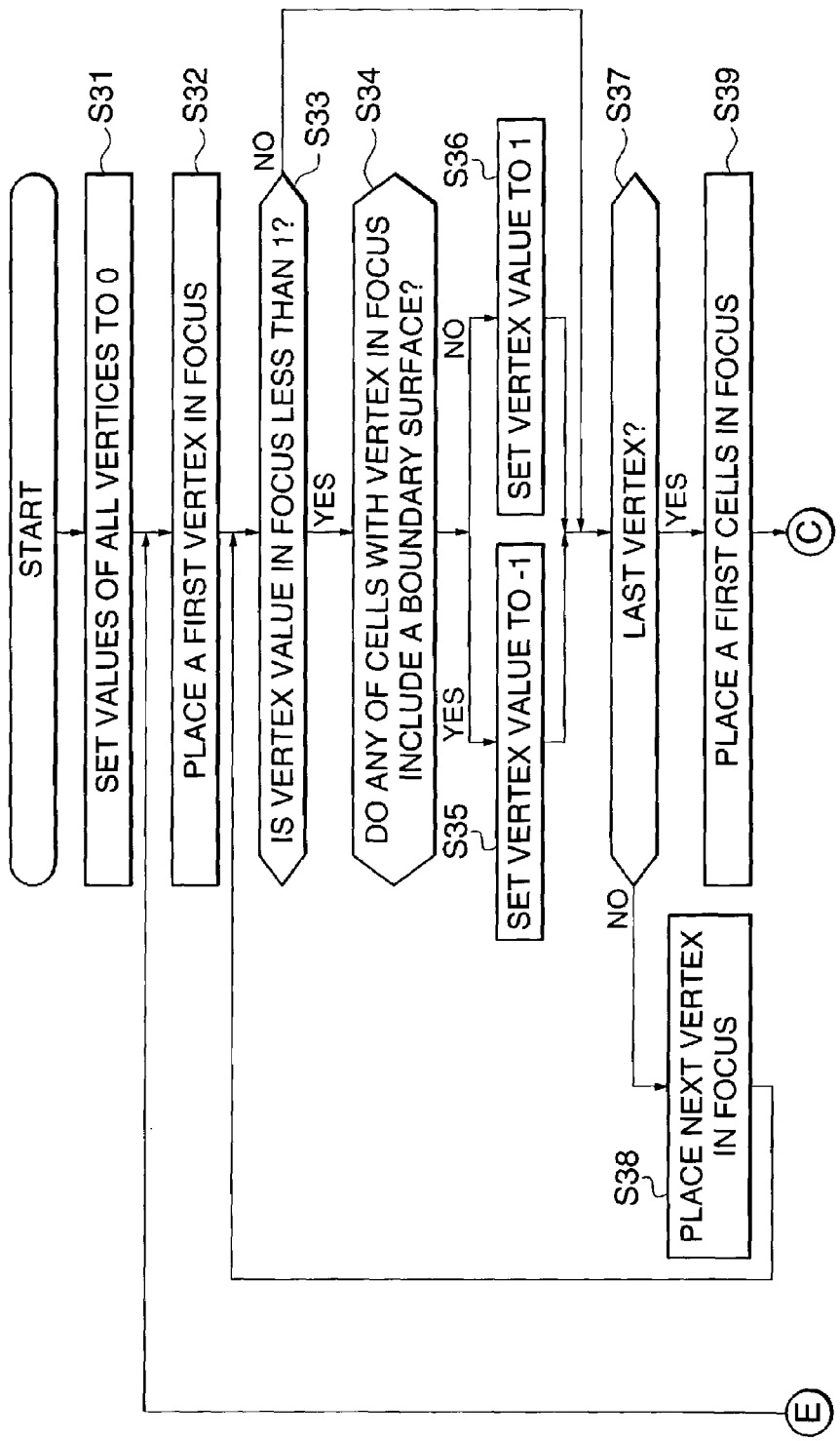
FIGS. 8A, 8B and 8C is a flowchart showing processing procedure for executing a boundary surface representing algorithm according to a second embodiment of the present invention.
Figure 8B:
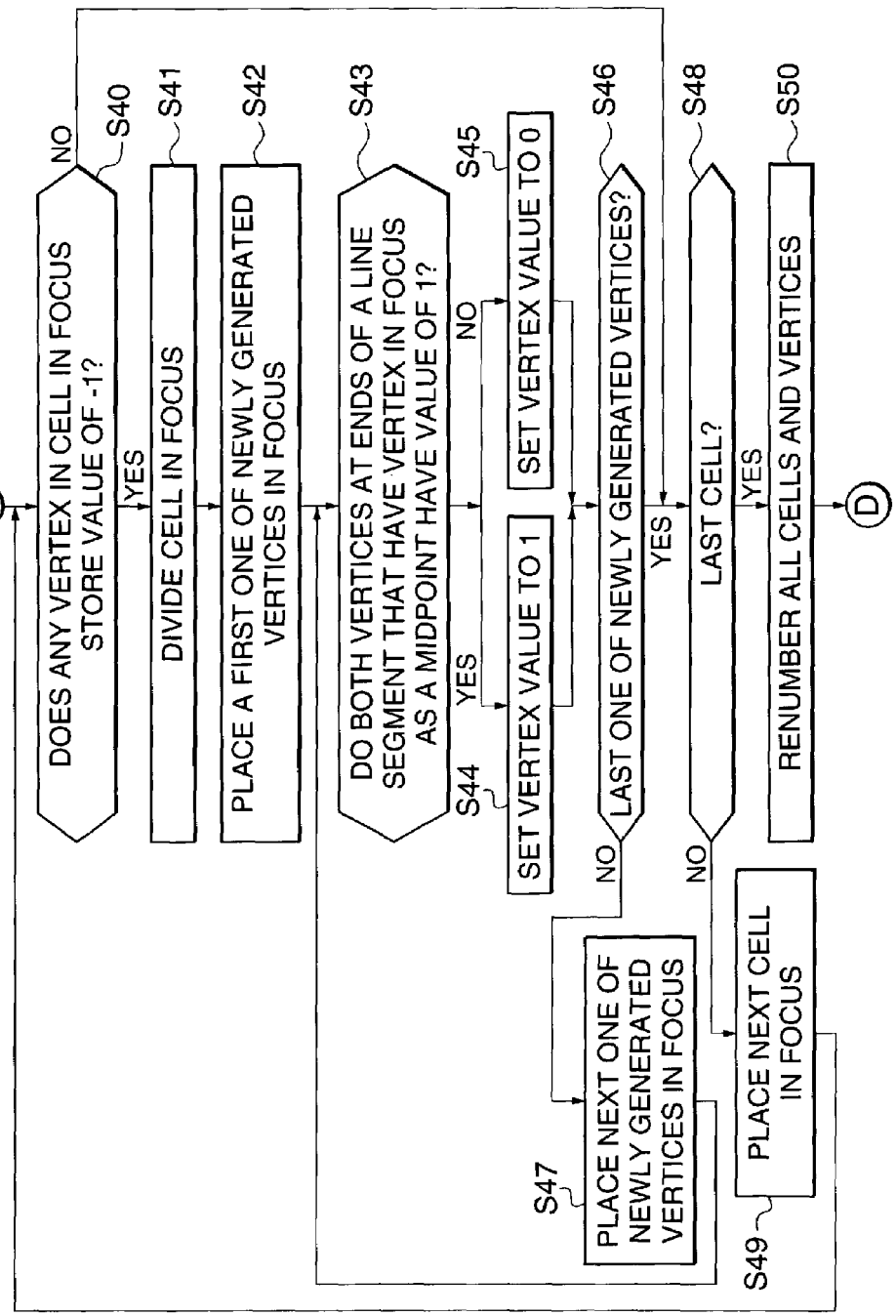
Figure 8C:
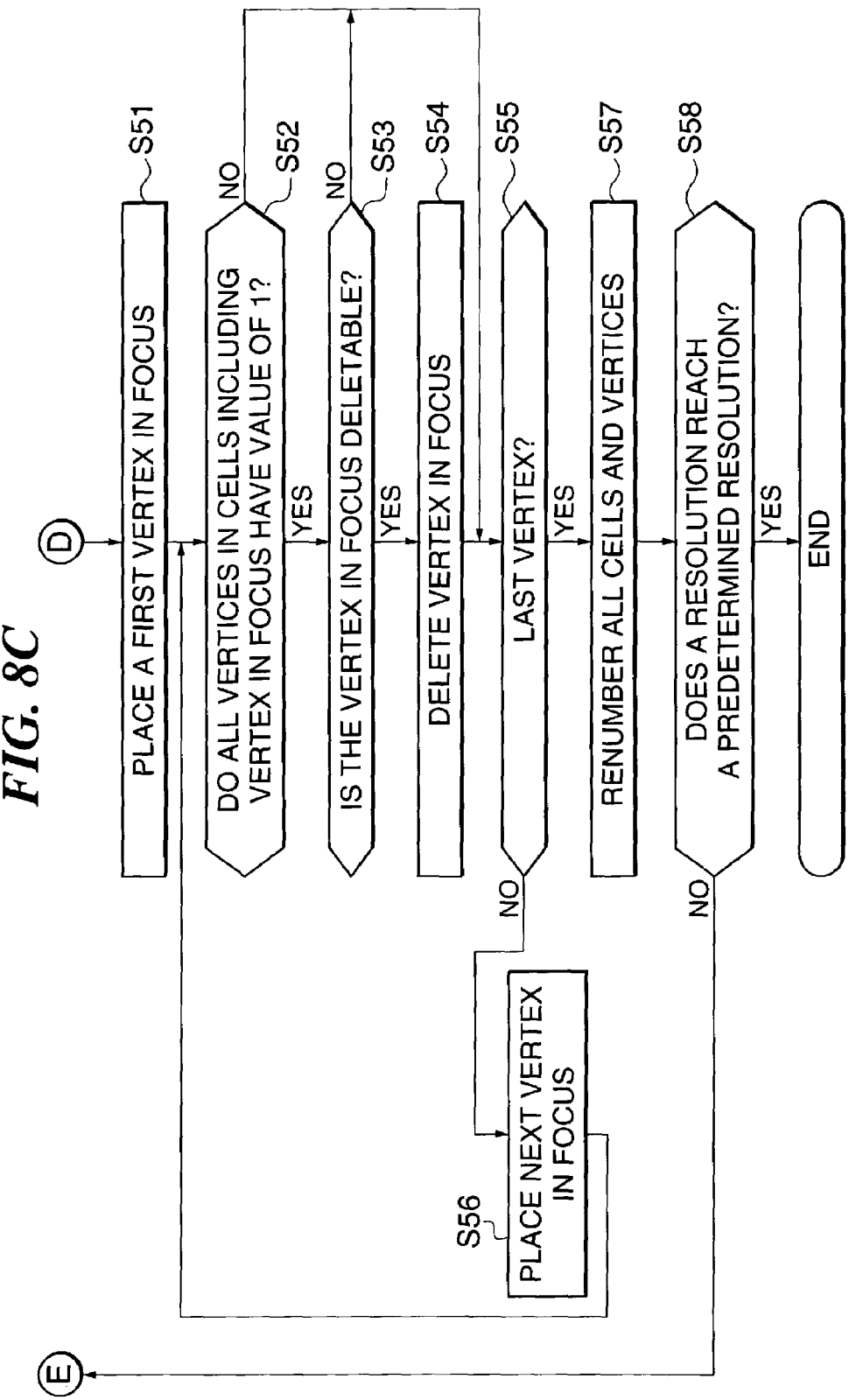

As in the first embodiment, in the present embodiment a two-dimensional or one-dimensional boundary surface figure is provided in advance with respect to a hierarchical lattice formed of cells of polyhedra or polygons that are composed of vertices and line segments. FIGS. 8A, 8B and 8C is a flowchart showing processing procedure for executing a boundary surface representing algorithm according to the second embodiment. As mentioned above, an executable file for this processing program is stored on the hard disk drive 117 or on the flexible disk 110 and is executed by the CPU 116.

It is provided that all the cells and vertices are numbered in advance. First, as an initial process, a value of 0 is assigned to every vertex in a basic lattice that has the form of a lattice and is present in a region to be processed in a hierarchical lattice (step S21). After this, by repeatedly performing the three operations A, B, and C that will be described below until a hierarchical lattice of the desired resolution is produced (steps S32 to S58), the boundary surface figure is represented by a hierarchical lattice.

In operation A in steps S32 to S38, out of all vertices, a first one of the numbered vertices is placed into focus (step S32). It is judged whether a value of the vertex in focus is less than 1 (step S33). When the value is less than 1 (YES in step S33), it proceeds to step 34, otherwise it proceeds to step 37. It is determined that any of the cells that include this vertex includes a boundary surface (step S34). When this is the case (YES in step S34), the value of −1 is assigned to the vertices (step S35), and when this is not the case (NO in step S34), the value of 1 is assigned to the vertex (step S36). If the vertex in focus is not the last one of the numbered vertices (NO in step S37), the next one of the numbered vertices is placed into focus (step S38), and the steps S33 to S37 are repeated. If the vertex in focus is the last one (YES in step S37), the process proceeds to operation B.

In operation B in steps S39 to S50, a first one of the numbered cells in the region is placed into focus (step S39), and when any vertex in the cell in focus stores the value of −1 (YES in step S40), the cell in focus is divided (step S41), whereby new vertices are generated. It is provided that the newly generated vertices are also numbered. A first one of the newly generated vertices is placed into focus (step S42). When vertices at both ends of a line segment that has the vertex in focus as a midpoint have the value of 1 (YES in step S43), the vertex in focus is assigned the value of 1 (step S44), and when this is not the case (NO in step S43), the vertex in focus is assigned the value of 0 (step S45). If the vertex in focus is not the last one of the newly generated vertices (NO in step S46), the next one of the newly generated vertices is placed into focus (step S47), and the steps S43 to S46 are repeated. If the vertex in focus is the last one (YES in step S46), it is judged whether the cell in focus is the last one (step S48). If it is not the case, the next one of the numbered cells is placed into focus (step S49), and the steps S10 to S18 are repeated. If the cell in focus is the last one (YES in step S48), all the cells and vertices are renumbered, and then the process proceeds to operation C.

In operation C in steps S51 to S57, a first one of the renumbered vertices is placed in focus (step S51), and when all of the vertices in all the cells including the vertex in focus have the value of 1 (YES in step S52), it is judged whether the vertex in focus is deletable (step S53). The vertex in focus is deleted if it is deletable (step S54). If the vertex in focus is not the last one of the renumbered vertices (NO in step S55), the next one of the renumbered vertices is placed into focus (step S56), and the steps S52 to S55 are repeated. If the vertex in focus is the last one (YES in step S55), all the cells and vertices are renumbered. Then it is determined that a hierarchical lattice of the desired resolution is produced (step S58). If it is not the case, the operations A, B and C are repeated and if the hierarchical lattice of the desired resolution is obtained, the process is completed.

Figure 10:
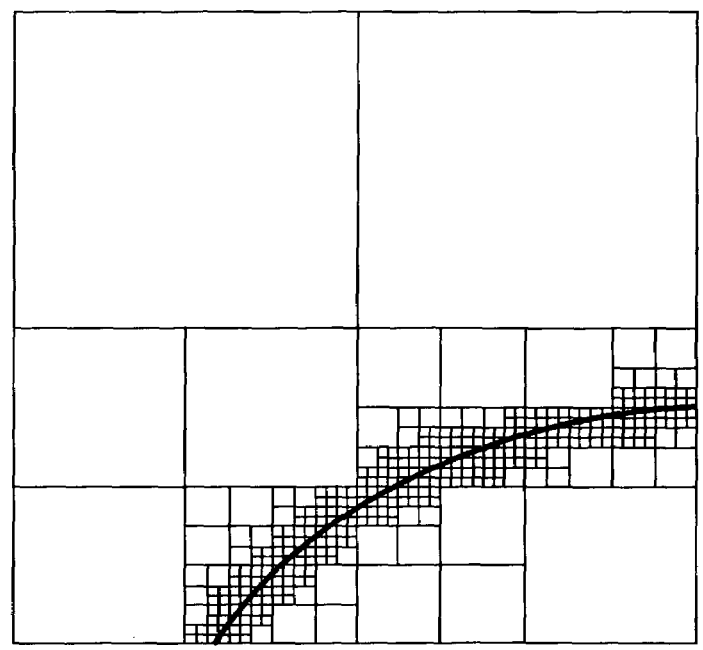
FIG. 10 is a diagram showing a hierarchical lattice that has reached a desired resolution after operation A, operation B, and operation C have been repeatedly performed in the boundary surface representing algorithm shown in FIGS. 8A, 8B and 8C.

In more detail, the following shows a case that is based on a square lattice provided in the form of squares in a two-dimensional plane as the hierarchical lattice. The generation of this hierarchical lattice is executed by the CPU 116 in the computer main unit 111, with the hierarchical lattice being constructed of a group of integers and floating point numbers in the memory 118. As shown in FIG. 10, described later, a hierarchical square lattice whose resolution differs in different areas is constructed.

Figure 9A:
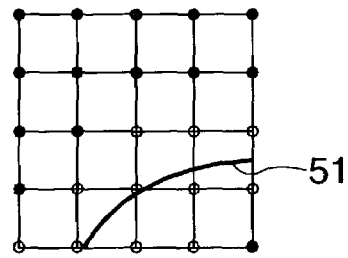
FIG. 9A is a diagram showing a state when operation A has been completed in the boundary surface representing algorithm shown in FIGS. 8A, 8B and 8C.

FIGS. 9A to 9D show generation procedure for a hierarchical lattice. First, an ordinary square lattice shown in FIG. 9A is prepared. In FIG. 9A, the boundary surface 51 shown by the thick line is provided in advance. In the present embodiment, the boundary surface 51 is composed of a piecewise segmental figure, and is constructed a sequence of very fine dots of vertices. For the sake of simplicity, a judgment as to whether a cell includes a line segment is performed by judging whether a vertex lies inside or outside the cell.

As in the first embodiment, a method of judging whether vertices lie inside or outside cells as disclosed by Japanese Laid-Open Patent Publication (Kokai) No. 11-110569 may be used as the method for the inside/outside judgment of vertices. By using such inside/outside judgments and an a sequence of dots of vertices that have been very finely subdivided for representing the boundary surface, it becomes easy to judge whether each square cell includes the boundary surface.

That is, in step S31 in FIGS. 8A, 8B and 8C, all of the vertices are given the value of 0. In operation A in steps S32 to S38, each of the vertices with a value which is less than 1 is placed into focus, and when any of the cells that include the vertex in focus includes the boundary surface, the vertex is assigned the value of −1. When this is not the case, the vertex is assigned the value of 1. After operation A has been performed for all of the vertices, operation B is performed.

In operation B of steps S39 to S49, each of the cells in the region is placed into focus. When any vertex in the cell in focus has the value of −1, the cell is divided. The vertex that is newly generated by this division is assigned the value of 1 when the values of vertices at both ends of the smallest line segment that has this vertex as a midpoint are 1, otherwise the newly generated vertex is assigned the value of 0. In step S50, all of the cells and vertices are renumbered.

In steps S51 to S56, when all of the vertices in cells that include each of the vertices in focus are 1, the vertex in focus is deleted and the cells are combined. In step S57, all of the cells and vertices are renumbered.

In step S58, it is judged whether the highest resolution in the region is a desired resolution that was provided in advance. When the highest resolution is the desired resolution (YES in step S58), the process is terminated. On the other hand, when the desired resolution has not been reached (NO in step S58), the process returns to step S32, whereby operations A, B, and C are repeated.

Furthermore, the judgment as to whether a cell includes a boundary surface in steps S4 or S34 may be performed based on a function defined on the entire area to be processed, whose values are positive inside of the boundary surface and negative outside of the boundary surface. The function may be either a discrete one such as a characteristic function with binary values or a continuous one such as a level set function. A change of positive and negative values may be performed by differential or integral values of the function. Furthermore, the value on the boundary surface may be a predetermined value which is not 0 and the judgment is performed by a comparison with the predetermined value. Furthermore a characteristic function with multi values may be adopted in consideration of types of materials of the object. The function can be implemented by setting a subroutine that returns a value at a point when the point is inputted. By using the function mentioned above, it is determined that a cell includes no boundary surface if a sign of a value of the function at each point is identical. This method is achieved by checking values of the function at a sufficiently large number of points. For example, a check may be performed at each vertex of all of partial cells generated by dividing the cell into a thousand. A number of partial cells may be given as a parameter. Furthermore, the check may be performed at each vertex of the cell without dividing the cell. Points for the check may be selected randomly from the cell by using pseudo random numbers. According to the method mentioned above, it can be easily judged whether or not each cell includes any boundary surfaces.

FIG. 9A shows the state when operation A has been completed. In the figure, the black circles indicate vertices with the value of 1, while the white circles indicate vertices with the value of −1. A region in the vicinity of the boundary surface 51 is dotted with the white circles. FIG. 9B shows the state when operation B been completed. All of the cells that included white circles in FIG. 9A have been divided. In FIG. 9B, the double white circles indicate vertices with the value of 0. As can be understood from FIG. 9B, the vertices that are newly generated by operation B are assigned the value of 1 or 0.

Figure 9C:
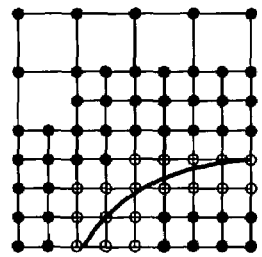
FIG. 9C is a diagram showing a state after operation A has been executed once again in the boundary surface representing algorithm shown in FIGS. 8A, 8B and 8C.
Figure 9B:
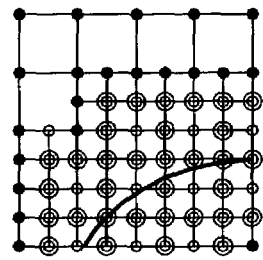
FIG. 9B is a diagram showing a state when operation B has been completed in the boundary surface representing algorithm shown in FIGS. 8A, 8B and 8C.
Figure 9D:
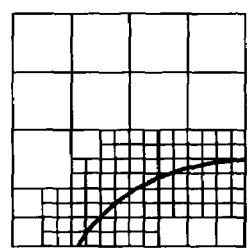
FIG. 9D is a diagram showing a state after operation B and operation C have been executed on the state shown in FIG. 9C.

FIG. 9C shows the state after operation A has been performed once again on the new group of cells shown in FIG. 9B. As can be seen from the figure, the white circles are localized in the vicinity of the boundary surface 51. The locality of the white circles in FIG. 9A and the locality of the white circles in FIG. 9C have different resolutions. FIG. 9D shows the state after operation B and operation C have been performed on the group of cells shown in FIG. 9C. By comparing this with FIG. 4D in the first embodiment, it can be seen that cells located away from the boundary surface have been combined.

In this way, operations A, B, and C are repeated until the highest resolution in a predetermined area reaches the desired resolution. FIG. 10 shows the square lattice when the desired resolution has been reached through the repeated execution of operation A, operation B, and operation C.

Figure 11A:
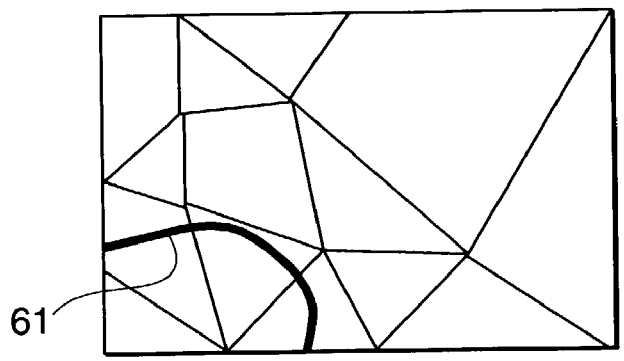
FIG. 11A is a diagram showing a triangular hierarchical lattice in an initial state.
Figure 11B:
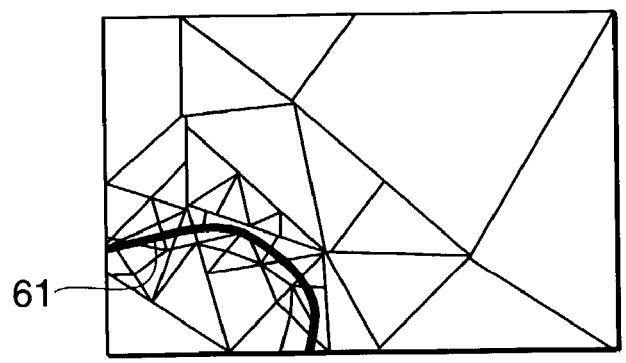
FIG. 11B is a diagram showing a triangular hierarchical lattice after the boundary surface representing algorithm shown in FIGS. 8A, 8B and 8C has been executed.

It should be noted that while the above embodiment shows the case when a lattice with square cells is used, the present invention is not limited to a certain shape of cells, and cells in the form of various polygons, such as triangles or random polygons, may be used. FIGS. 11A and 11B show a triangular hierarchical lattice. FIG. 11A shows the triangular hierarchical lattice in an initial state as in the first embodiment, and FIG. 11B shows the triangular hierarchical lattice after the boundary surface representing algorithm shown in FIGS. 8A, 8B and 8C has been executed. In this way, the boundary surface 61 is precisely represented with a desired resolution by a triangular hierarchical lattice, with the number of cells that have been combined at positions that are away from the boundary surface 61 being higher than in FIG. 6B of the first embodiment.

Figure 12:
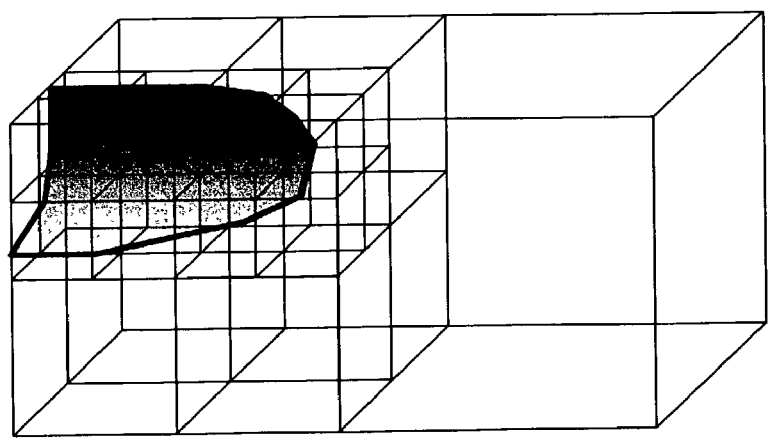
FIG. 12 is a diagram showing a three-dimensional hierarchical lattice after the boundary surface representing algorithm shown in FIGS. 8A, 8B and 8C has been executed.

While the above embodiment is applied to the case of a two-dimensional hierarchical lattice, the present invention is not affected by the number of dimensions, and may be therefore applied to a three-dimensional lattice system that is composed of cells in the form of blocks. FIG. 12 shows a three-dimensional hierarchical lattice that can be represented by performing the same processing as performed for the two-dimensional case.

Also, the same effects as steps S32 to S38 in FIGS. 8A, 8B and 8C above can be achieved by performing operations similar to steps S32 to S38 such that all vertices with a value of less than 1 are placed in focus, the values of such vertices are all initially set to +2, cells including the vertices with the value of +2 are placed into focus, all vertices that belong to any of the cells in focus that include the boundary surface are assigned the value of −1, the values of other vertices are left unchanged, and after this operation has been performed for every cell, finally changing the +2 values to +1. In this way, it is considered that the implementation of the discrete algorithm of the present invention may be achieved in a variety of ways. However, the characteristic of the present invention is the inclusion of a step of storing discrete information, which does not include distance information for adjacent cells, at vertices as implemented by part of steps S31 to S38, a step of judging whether to perform division based on the values of the vertices in the cell as implemented by part of steps S39 to S50, and a step of judging whether to combine cells based on the values of vertices in the same cells as implemented by part of steps S51 to S57. Accordingly, it can be understood that the above variation that includes these steps constitutes the present invention. Also, minor differences in the above variation do not affect the present invention.

While the embodiments of the present invention have been described above, the present invention is not limited to the configurations of these embodiments, and therefore may be realized in any configuration that can achieve the functions shown in the appended claims or the functions exhibited by the configurations of the embodiments.

It is to be understood that the object of the present invention may also be accomplished by supplying a system or an apparatus with a storage medium in which a program code of software which realizes the functions of the above described embodiments is stored, and causing a computer (or CPU or MPU) of the system or apparatus to read out and execute the program code stored in the storage medium.

In this case, the program code itself read from the storage medium realizes the functions of the embodiments described above, and hence the storage medium on which the program code is stored constitutes the present invention.

Examples of the storage medium for supplying the program code include a floppy (registered trademark) disk, a hard disk, an optical disk, a magnetic-optical disk, a CD-ROM, a CD-R, a CD-RW, DVD-ROM, a DVD-RAM, a DVD−RW, a DVD+RW, a magnetic tape, a nonvolatile memory card, and a ROM.

Further, it is to be understood that the functions of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of the above described embodiments may be accomplished by writing a program code read out from the storage medium into an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A hierarchical lattice generating method comprising:
    a generating step of generating a hierarchical lattice by dividing a group of cells that are composed of vertices and line segments present in a predetermined area, in accordance with a resolution;
    a representing step of representing a boundary surface, which is provided in the area, in the hierarchical lattice by hierarchically dividing cells in a vicinity of a boundary surface in the boundary surface;
    a first step of assigning a first value as an initial value to all of the vertices in the area in an initial state;
    a second step of assigning a second value to each of vertices in focus, out of the vertices in the area that have the first value, if any cell to which each of the vertices in focus belongs includes the boundary surface and otherwise assigning a third value to each of the vertices in focus, out of the vertices in the area that have the first value; and
    a third step of dividing each of the cells, out of all of the cells in the area, to which vertices that have the second value belong, assigning the third value to a vertex that is newly generated by the dividing if vertices at both ends of a line segment that has the newly generated vertex as a midpoint have the third value, and otherwise assigning the first value to the newly generated vertex.

2. A hierarchical lattice generating method according to claim 1, further comprising a fourth step of targeting each vertex, after the third step, deleting the targeted vertex if all of the vertices belonging to all of the cells containing the targeted vertex have the third value, and combining a plurality of cells containing the deleted vertex into at least one cell.

3. A hierarchical lattice generating method according to claim 1, wherein the second step and the third step are repeatedly performed in order until a highest resolution in the area reaches a predetermined resolution.

4. A hierarchical lattice generating method according to claim 2, wherein the second step, the third step, and the fourth step are repeatedly performed in order until a highest resolution in the area reaches a predetermined resolution.

5. A hierarchical lattice generating method according to claim 1 and 2, wherein the group of cells are in a form of polygons.

6. A hierarchical lattice generating method according to claim 1, wherein the group of cells are in a form of blocks.

7. A hierarchical lattice generating method according to claim 1, wherein there is provided a function which has positive values inside of the boundary surface and negative values outside of the boundary surface, and in said second step, it is judged whether or not a cell includes the boundary surface based on values of the function in the cell.

8. A hierarchical lattice generating apparatus, comprising:
    generating means for generating a hierarchical lattice by dividing a group of cells that are composed of vertices and line segments present in a predetermined area, in accordance with a resolution;
    representing means for representing a boundary surface, which is provided in the area, in the hierarchical lattice by hierarchically dividing cells in a vicinity of a boundary surface in the boundary surface;
    first assigning means for assigning a first value as an initial value to all of the vertices in the area in an initial state;
    second assigning means for assigning a second value to each of vertices in focus, out of the vertices in the area that have the first value, if any cell to which each of the vertices in focus belongs includes the boundary surface and otherwise assigning a third value to each of the vertices in focus, out of the vertices in the area that have the first value; and
    third assigning means for dividing each of the cells, out of all of the cells in the area, to which vertices that have the second value belong, assigning the third value to a vertex that is newly generated by the dividing if vertices at both ends of a line segment that has the newly generated vertex as a midpoint have the third value, and otherwise assigning the first value to the newly generated vertex.

9. A hierarchical lattice generating apparatus according to claim 8, further comprising combining means for targeting each vertex, after processing by the third assigning means, deleting the targeted vertex if all of the vertices belonging to all of the cells containing the targeted vertex have the third value, and combining a plurality of cells containing the deleted vertex into at least one cell.

10. A hierarchical lattice generating apparatus according to claim 8, wherein processing by the second assigning means and the third assigning means is repeatedly performed in order until a highest resolution in the area reaches a predetermined resolution.

11. A hierarchical lattice generating apparatus according to claim 9, wherein processing by the second assigning means, the third assigning means, and the combining means is repeatedly performed in order until a highest resolution in the area reaches a predetermined resolution.

12. A hierarchical lattice generating apparatus according to claim 8, wherein the group of cells are in a form of polygons.

13. A hierarchical lattice generating apparatus according to claim 8, wherein the group of cells are in a form of blocks.

14. A hierarchical lattice generating apparatus according to claim 8, wherein there is is provided a function which has positive values inside of the boundary surface and negative values outside of the boundary surface, and said second assigning means judges whether or not a cell includes the boundary surface based on values of the function in the cell.

15. A program stored on a computer-readable medium for realizing a hierarchical lattice generating method according to claim 1.

* * * * *